(12) United States Patent
Rappaport

(10) Patent No.: US 7,835,760 B2
(45) Date of Patent: Nov. 16, 2010

(54) SYSTEMS AND METHODS FOR FACILITATING COMMUNICATIONS OVER A SHARED CHANNEL

(75) Inventor: Matthew B. Rappaport, Gainseville, FL (US)

(73) Assignee: Mobile Satellite Ventures, LP, Reston, VA (US)

( * ) Notice: Subject to any disclaimer, the term of this patent is extended or adjusted under 35 U.S.C. 154(b) by 1503 days.

(21) Appl. No.: 11/197,357

(22) Filed: Aug. 5, 2005

(65) Prior Publication Data

US 2007/0030834 A1   Feb. 8, 2007

(51) Int. Cl.
*H04B 7/00* (2006.01)
*H04B 15/00* (2006.01)

(52) U.S. Cl. ............... 455/512; 455/500; 455/502; 455/507; 455/509; 455/510; 455/513; 455/514; 455/515; 455/516; 455/452.1; 455/452.2; 455/445; 455/454; 455/455; 370/235; 370/238; 370/445; 370/447; 370/448; 370/461; 370/462

(58) Field of Classification Search .......... 455/500, 455/502, 507–516, 452.1, 452.2, 445, 454, 455/455; 370/231–235, 236–238, 445, 447, 370/448, 461, 462
See application file for complete search history.

(56) References Cited

U.S. PATENT DOCUMENTS

| 4,736,371 | A | 4/1988 | Tejima et al. |
| 6,078,577 | A | 6/2000 | Bishop, Jr. et al. |
| 6,236,646 | B1 | 5/2001 | Beming et al. |
| 6,414,955 | B1* | 7/2002 | Clare et al. ............. 370/390 |
| 6,501,745 | B1 | 12/2002 | Turina et al. |
| 6,567,396 | B1 | 5/2003 | Pohjanvouri et al. |
| 6,611,495 | B1 | 8/2003 | Meyer et al. |
| 6,738,366 | B1 | 5/2004 | Etemad et al. |
| 6,741,559 | B1* | 5/2004 | Smeulders et al. ....... 370/230 |
| 6,765,882 | B2 | 7/2004 | Rittle et al. |
| 6,778,509 | B1 | 8/2004 | Ravishankar et al. |
| 6,847,629 | B2 | 1/2005 | Razoumov et al. |
| 6,850,509 | B2 | 2/2005 | Lee et al. |
| 7,023,821 | B2* | 4/2006 | Wotherspoon et al. ... 370/329 |
| 7,418,004 | B2* | 8/2008 | Chou ................... 370/449 |
| 2003/0137989 | A1* | 7/2003 | Nagai ................... 370/455 |
| 2005/0232294 | A1* | 10/2005 | Quigley et al. .......... 370/436 |
| 2006/0062181 | A1* | 3/2006 | Chou .................... 370/329 |
| 2008/0151823 | A1* | 6/2008 | Quigley et al. .......... 370/329 |

OTHER PUBLICATIONS

John I. Capetanakis, "Tree Algorithms for Packet Broadcast Channels", IEEE Transactions on Information Theory, vol. IT-25, No. 5, pp. 505-515, 1979.

* cited by examiner

*Primary Examiner*—Tuan A Tran
(74) *Attorney, Agent, or Firm*—Snyder, Clark, Lesch & Chung, LLP

(57) ABSTRACT

A node may include a receiver configured to receive signals transmitted from a gateway and a logic device coupled to the receiver. The node may also include a memory configured to store label information identifying a data packet stored in the node. The logic device may be configured to receive a message from the gateway, where the message includes label information, and access the memory to identify a data packet based on the label information included in the message. The node may also include a transmitter configured to transmit the data packet to the gateway over a channel shared with a number of other nodes.

27 Claims, 12 Drawing Sheets

SYSTEMS AND METHODS FOR FACILITATING COMMUNICATIONS OVER A SHARED CHANNEL

BACKGROUND OF THE INVENTION

1. Field of the Invention

The invention relates generally to data communications and, more particularly, to transmitting data over a shared channel.

2. Description of Related Art

Data communications systems often include a number of nodes that transmit data to a destination over a shared channel. Since there may be a large number of nodes in such systems, multiple nodes often transmit data at the same time. As a result, data collisions involving simultaneous transmissions over the shared channel often occur.

When a data collision involving a number of transmitting nodes occurs, the destination device is unable to determine what each node actually transmitted. For example, the destination device may be unable to accurately decode the transmissions from the multiple nodes. In conventional systems, each node may re-send its data one or more times until the data transmission from each node is correctly received at the destination device and an acknowledgement is sent from the destination device to each node that transmitted data. One problem with such conventional systems is that the data throughput is reduced since no agent limits how nodes access the network, resulting in more collisions and subsequent re-transmissions. That is, transmitting data from a node to a destination device, waiting for an acknowledgement from the destination device and then having to re-send the data one or more times is inefficient and results in low data throughput.

In other conventional systems used to resolve data collisions, data packets may be assigned either a high or low priority after a collision occurs. The high priority packets may then be re-sent to the destination. If a collision occurs on this re-transmission or any subsequent re-transmission, the colliding packets may be subdivided again into high and low priority packets until only a single packet is being transmitted. Once high priority packets from a collision are correctly received, the process may be repeated for low priority packets.

One problem with this conventional type of rigid collision resolution system, in which a subset of colliding packets must be received successfully before any others are sent, is apparent in systems with propagation delay. For example, the destination device must wait for information to be received at the destination device regarding past information request(s) before a subsequent request for information is sent to the nodes. As a result of this waiting, channel utilization is decreased and data throughput is reduced when collisions are resolved in this manner.

SUMMARY OF THE INVENTION

In an exemplary implementation, a node that includes a receiver, a memory, at least one logic device and a transmitter is provided. The receiver is configured to receive signals transmitted from a gateway and the logic device is coupled to the receiver. The memory is configured to store label information identifying at least one data packet stored in the node. The logic device is configured to receive a message from the gateway, where the message includes label information. The logic device is also configured to access the memory to identify a first data packet based on the label information included in the message. The transmitter is configured to transmit the first data packet to the gateway over a channel shared with a number of other nodes.

In another implementation, a network device for controlling transmission of data from a plurality of nodes sharing a channel is provided. The network device includes a receiver configured to receive transmissions sent by the plurality of nodes. The network device also includes control logic configured to generate a first message requesting transmission of data from the plurality of nodes, where the first message includes an identification label. The network device further includes a memory configured to store a first plurality of identification labels associated with a plurality of messages transmitted by the network device and a second plurality of identification labels associated with messages to be transmitted by the network device. The network device also includes a transmitter configured to broadcast the first message to the plurality of nodes.

In still another implementation, a method is provided in a network device configured to control communication of data transmitted from a number of nodes over a shared communication medium. The method includes generating a first request for data from the nodes, where the first request includes a first identifier. The method also includes transmitting the first request to the nodes, detecting a collision involving data transmitted in response to the first request and generating first and second values in response to detecting the collision, where the first and second values are associated with the first identifier. The method further includes transmitting a collision message to the nodes and transmitting a first request for re-transmission to the nodes, where the first request for re-transmission includes the first identifier and the first value.

In yet another implementation, a computer-readable medium having stored sequences of instruction is provided. The instructions, when executed by at least one processor, cause the processor to receive a message transmitted from a broadcast device, the message including a collision tree identifier and a priority value associated with the collision tree. The instructions also cause the processor to identify a data packet in response to the message, the data packet being associated with information matching the collision tree identifier and the priority value. The instructions further cause the processor to transmit the data packet to the broadcast device over a channel shared with a number of other nodes.

In a further implementation, a system that includes a network device and a number of nodes is provided. The network device controls transmission of data from the nodes and the nodes share a channel. The network device is configured to generate a first request for data from the plurality of nodes, where the first request includes tree information and a priority value. The network device is also configured to transmit the first request, detect a collision involving data transmitted in response to the first request, generate first and second values in response to detecting the collision, the first and second values representing new priority values associated with the tree information. The network device is further configured to transmit a collision message and transmit a request for re-transmission, the request for re-transmission including the tree information and the first value. Each of the nodes is configured to receive the first request, determine whether information corresponding to the priority value is stored in the node and transmit a data packet when the determining determines that information corresponding to the priority value is stored in the node. Each of the nodes is further configured to receive the request for re-transmission, determine whether information matching the tree information and the first value is stored in the node and re-transmit a data packet when the determining determines that information matching the tree information and the first value is stored in the node.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems, devices and methods consistent with the invention enable multiple nodes to transmit data over a shared channel. When data collisions occur, a re-transmission procedure may be performed to enable the colliding transmissions to be resolved in an efficient manner.

Exemplary Network

Figure 1:
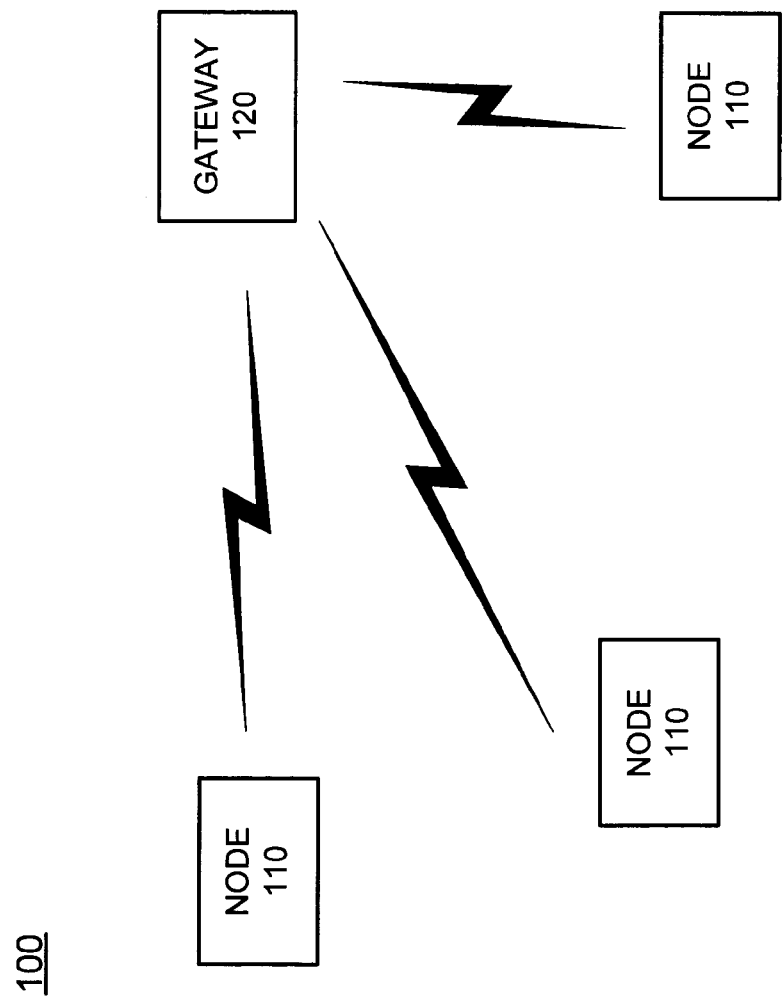
FIG. 1 is a diagram of an exemplary network in which systems and methods consistent with the invention may be implemented.

FIG. 1 illustrates an exemplary network in which systems and methods consistent with the invention may be implemented. Network 100 may include a number of nodes 110 and a gateway 120. The number of components illustrated in FIG. 1 is provided for simplicity. It will be appreciated that a typical network 100 may include more or fewer components than are illustrated in FIG. 1. For example, only three nodes 110 and a single gateway 120 are illustrated in FIG. 1. It should be understood that network 100 may include a large number of nodes 110 (e.g., hundreds or more) and multiple gateways 120. In addition, other devices/systems may be included in network 100, such as a network operations center and backend systems (not shown) that aid in providing information and/or controlling other elements in network 100.

Nodes 110 may transmit and receive information over wired, wireless and/or optical links. Nodes 110 may also interface with user devices, such as personal computers (PCs), lap top computers, personal digital assistants (PDAs), wireless telephones, televisions (TVs), TV set top boxes, etc. Nodes 110 may directly connect to a user device via, for example, a universal serial bus (USB). Nodes 110 may also connect to user devices via a local area network (LAN) interface, such as an Ethernet interface. In alternative embodiments, nodes 110 may include user devices that generate data packets, such as PCs, lap tops, PDAs, wireless telephones, TVs, TV set top boxes, etc. In one embodiment, nodes 110 may represent earth-based terminals that communicate with a satellite gateway via an air/free space interface. In other embodiments, nodes 110 may include mobile nodes, nodes located in satellites or any other node capable of transmitting and receiving data.

Gateway 120 may include any device that controls and/or supports two-way communications with nodes 110. In an exemplary embodiment, gateway 120 may be included on a satellite (e.g., a satellite payload) and may control communications with earth-based terminals/stations (e.g., nodes 110). In this embodiment, gateway 120 may include one or more uplink antennas and one or more downlink antennas for receiving data from and transmitting data to nodes 110. For example, gateway 120 may receive data transmitted from nodes 110 in any frequency band (e.g., C-band, Ku-band, Ka-band, X-band, etc). Gateway 120 may also include transmit circuitry to permit gateway 120 to use the downlink antenna(s) to transmit data using various ranges of frequencies. For example, gateway 120 may transmit data in any of the above frequency bands (i.e., C-band, Ku-band, Ka-band, X-band) or in other frequency bands.

In alternative embodiments, gateway 120 may be an earth-based station, such as a base station, associated with controlling transmission of data from nodes 110. In addition, in some embodiments, gateway 120 may be an intermediate device and may forward data received from nodes 110 to another gateway device, node or other destination.

As described above, a number of other devices, such as a network operations center may be included in network 100. The network operations center may, for example, determine the appropriate power levels associated with transmitting data to nodes 110 and may transmit this information to gateway 120 regarding downlink power control. Backend systems may also be included in network 100 and may provide an interface between network 100 and an external network, e.g., a broadcast television network, the Internet, a private network, etc.

Figure 2:
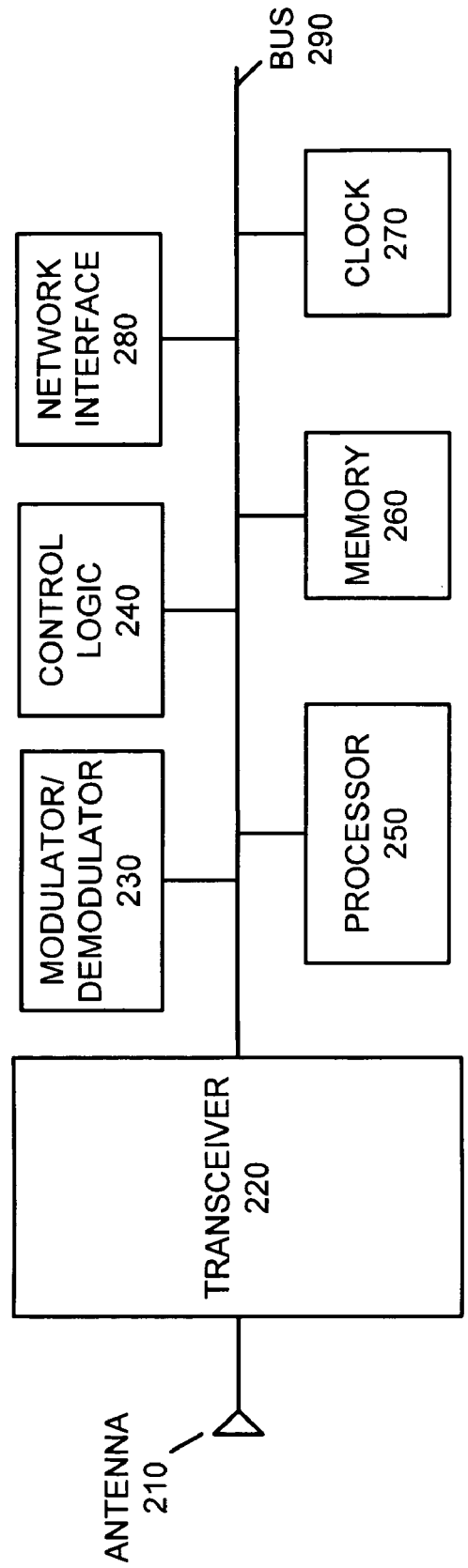
FIG. 2 is a diagram illustrating an exemplary configuration of the node or gateway of FIG. 1.

FIG. 2 illustrates an exemplary configuration of a node 110. Gateway 120 may be configured in a similar manner. Referring to FIG. 2, node 110/gateway 120 may include an antenna 210, a transceiver 220, a modulator/demodulator 230, control logic 240, a processor 250, a memory 260, a clock 270, a network interface 280 and a bus 290.

Antenna 210 may include one or more antennas (e.g., directional and/or omni-directional) capable of transmitting/receiving signals via radio waves. For example, antenna 210 may transmit/receive data in the C-band, Ku-band, Ka-band, X-band. Antenna 210 may also transmit/receive information in other frequency bands.

Transceiver 220 may include transmitter and receiver circuitry for transmitting and/or receiving data in a network, such as network 100. Modulator/demodulator 230 may include circuitry that combines data signals with carrier signals via modulation and extracts data signals from carrier signals via demodulation. Modulator/demodulator 230 may also include components that convert analog signals to digital signals, and vice versa, for communicating with other devices in node 110/gateway 120.

Control logic 240 may include one or more logic devices, such as application specific integrated circuits (ASICs), that control the operation of node 110/gateway 120. For example, control logic 240 may include logic circuitry that performs a coding operation for received data packets.

Processor 250 may include any type of processor or microprocessor that interprets and executes instructions. Processor 250 may perform data processing functions relating to transmitting data from node 110 to gateway 120 or vice versa.

Memory 260 may provide permanent, semi-permanent, or temporary working storage of data and instructions for use by processor 250 in performing processing functions. Memory 260 may include a random access memory (RAM) or another dynamic storage device that stores information and instructions for execution by processor 250. Memory 260 may also include a read only memory (ROM), an electrically erasable programmable read only memory (EEPROM) or another static or non-volatile storage device that stores instructions and information for use by processor 250. Memory 260 may further include a large-capacity storage device, such as a magnetic and/or optical recording medium and its corresponding drive.

Clock 270 may include circuitry for performing timing-related operations associated with one or more functions performed by node 110/gateway 120. Clock 270 may include, for example, one or more oscillators and/or one or more counters.

Network interface 280 may include an interface that allows node 110/gateway 120 to be coupled to a network. For example, network interface 280 may include a USB interface, an Ethernet interface for communicating to a LAN, an asynchronous transfer mode (ATM) network interface and/or an interface to a cable network. Alternatively, network interface 280 may include other mechanisms for communicating with other devices and/or systems via wired, wireless and/or optical links.

Bus 290 may include one or more buses that interconnect the various components of node 110/gateway 120 to permit the components to communicate with one another. The configuration of node 110/gateway 120, shown in FIG. 2, is provided for illustrative purposes only. One skilled in the art will recognize that other configurations may be employed. Moreover, one skilled in the art will appreciate that a typical node 110/gateway 120 may include other devices that aid in the reception, transmission, and/or processing of data. It should also be understood that various components of node 110/gateway 120 may be located remotely from each other. For example, in node 110, antenna 210 may be located outdoors, while other elements in node 110 may be located indoors.

Node 110/gateway 120, consistent with the invention, performs processing associated with transmitting and receiving data in network 100. Node 110/gateway 120 may perform such processing, described in detail below, in response to processor 250 executing sequences of instructions contained in a computer-readable medium, such as memory 260. It should be understood that a computer-readable medium may include one or more memory devices and/or carrier waves. The instructions may be read into memory 260 from another computer-readable medium or from a separate device via network interface 280. Execution of the sequences of instructions contained in memory 260 causes processor 250 to perform the acts that will be described hereafter. In alternative implementations, hard-wired circuitry may be used in place of, or in combination with, software instructions to implement the present invention. For example, control logic 240 and/or other devices, such as modulator/demodulator 230, may perform one or more of the acts described below. In still other alternatives, various acts may be performed manually, without the use of node 110/gateway 120. Thus, the present invention is not limited to any specific combination of hardware circuitry and software.

Node 110, as discussed above, may receive data packets from user devices, such as PCs, laptops, PDAs, wireless telephones, TVs, TV set top boxes, etc. Alternatively, node 110 may include such user devices that generate data packets for transmission to gateway 120. In either case, node 110 may process the data packets (e.g., encode the data packets) and forward the data packets to gateway 120. In an exemplary embodiment, nodes 110 may transmit data to gateway 120 using a shared channel. As a result, collisions may occur when two or more nodes 110 simultaneously transmit data over the shared channel. Each of nodes 110, consistent with the invention, may store various information that facilitates transmission and re-transmission of data to gateway 120 in an efficient manner.

Figure 3:
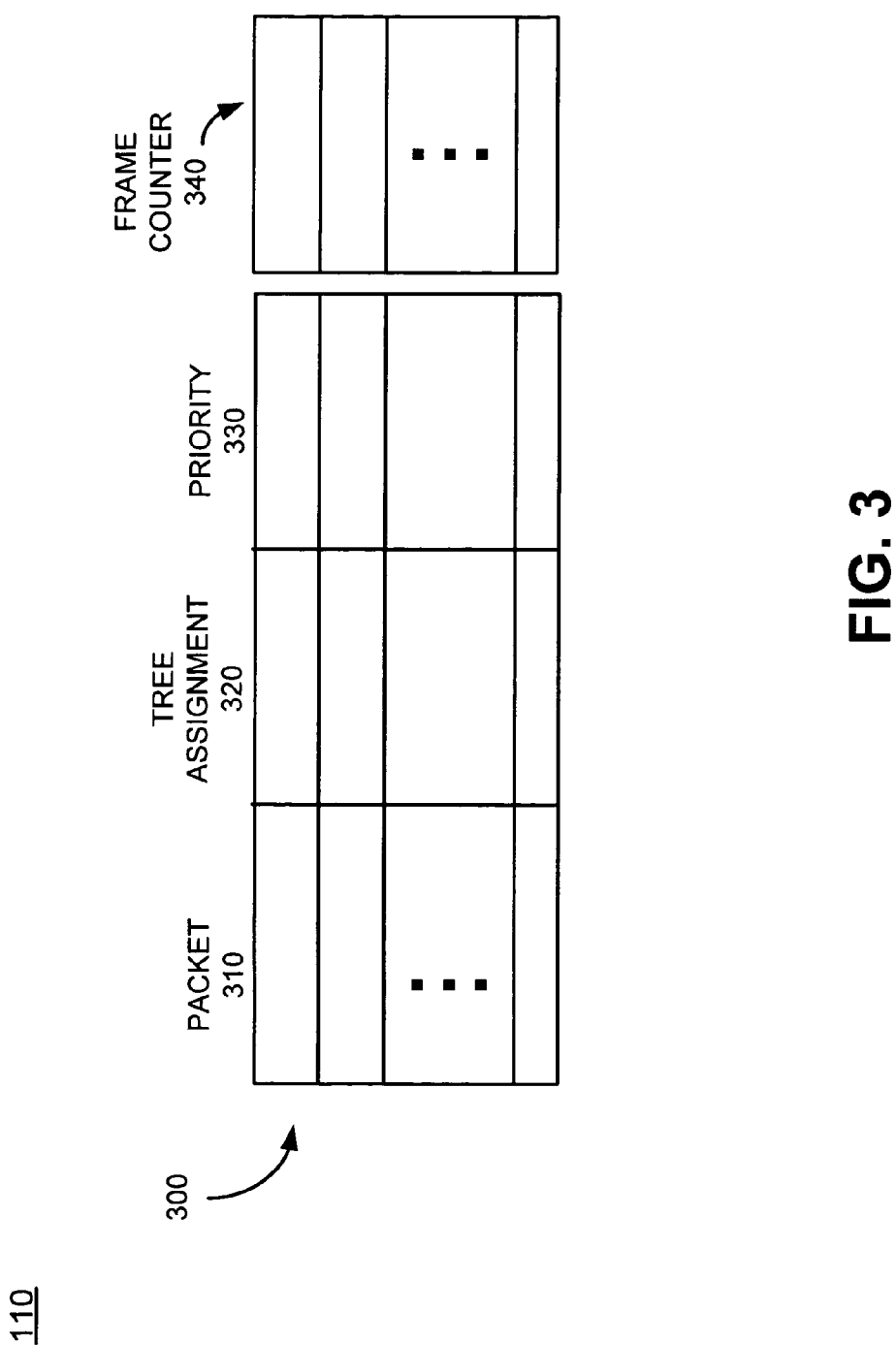
FIG. 3 is a block diagram illustrating exemplary elements implemented in the node of FIG. 1.

FIG. 3 is a block diagram of exemplary elements implemented in node 110. The elements illustrated in FIG. 3 may be implemented in software, hardware or combinations of hardware/software. Referring to FIG. 3, node 110 may include a table 300 that includes a packet field 310, a tree assignment field 320 and a priority field 330. Node 110 may also include a frame counter 340 that stores a count value for each of the rows in table 300. The information stored in fields 320 and 330 together may represent a label, referred to herein as a tree assignment/priority (TAP) label, associated with the data packet stored in the corresponding entry in field 310.

In general, TAP labels may be the combination of two pieces of information that specify the packet's precedence in relation to other packets. The value in tree assignment field 320 identifies a resolution tree to which the packet has been assigned by gateway 120 and the value in priority field 330 identifies the packet's priority within the resolution tree. For example, a TAP label of "B7" denotes that a packet belongs to tree B and has a priority value of 7 within that tree.

In an exemplary implementation, tree assignment field 320 may take on one of X+1 possible values (e.g., "none", A, B, C, . . . ). The value "X" may represent a number of frames that is equal to the round trip propagation delay time for a signal to be transmitted from node 110 to gateway 120 and back to node 110. For example, if the round trip propagation delay time is 100 milliseconds (ms) and the duration of each frame is 10 ms, the value of X is 10. In other words, 10 frames may be transmitted in a period that is equal to the round trip propagation delay from node 110 to gateway 120 and back. In this case, 10 possible collision resolution trees may be used in network 100 at any given time.

The value of "none" in packet tree assignment field 320 may be used to identify a packet that has just been created and has not been transmitted. That is, a packet does not belong to a resolution tree before it has been transmitted. The labels/identifiers (e.g., none, A, B, C, . . . ) refer to the names of resolution trees that may be used by node 110 and gateway 120.

Priority field 330 may store a "priority" value associated with a particular packet. In an exemplary embodiment, the priority values may be 0, 1, 2, 3, etc. All packet priorities may be initialized to a priority of, for example, 0 when they are first created since such packets do not belong to a resolution tree at that time.

The information stored in table 300 may be used to facilitate re-transmission of data packets. For example, following a collision, each packet involved in the collision may have its TAP label altered using a process that includes a random element. This may serve to prevent the same packets from colliding again in response to subsequent re-transmission requests.

In addition to a common TAP naming scheme used by nodes 110 and gateway 120, nodes 110 and gateway 120 may also be aware of the propagation delay within network 100. That is, nodes 110 and gateway 120 are aware of the round trip propagation time X for sending a signal (e.g., a data packet) from node 110 to gateway 120 and back to node 110. This may aid nodes 110 in monitoring the results of their transmissions or determine when an acknowledgement message refers to their transmissions X frames after they were sent.

In an exemplary implementation, the propagation time may be ascertained by nodes 110 sending test signals to gateway 120 during start-up/initialization and waiting for an acknowledgment to be received. In an alternative implementation, nodes 110 and gateway 120 may be pre-configured to store the propagation time using, for example, a priori information. In still other alternatives, gateway 120 may determine the maximum propagation delay associated with a node 110 in network 100 and broadcast this information to nodes 110. This may be useful in situations where nodes 110 are mobile stations/terminals. In each case, the value representing the propagation delay that is stored in each node 110 may be modified or programmable to reflect the particular network requirements associated with the propagation delay in network 100. In addition, in some implementations, the value representing the propagation delay may take into account processing time/delays associated with processing performed by node 110 and/or gateway 120. That is, the propagation delay may take into account processing time associated with node 110 and/or gateway 120 receiving information and generating a response to the received information.

Frame counter 340 may be used to count time associated with each transmission from node 110. For example, each packet stored in packet field 310 may have a corresponding count value maintained and stored in a corresponding entry in frame counter 340. Alternatively, the values in frame counter 340 may be included within table 300. In either case, in an exemplary embodiment, frame counter 340 may be initialized to store the round trip propagation delay time associated with transmitting a signal from node 110 to gateway 120 and back to node 110 (i.e., X). In some implementations, each node 110 may have a different propagation delay value since the distances between various nodes 110 and gateway 120 may vary. Node 110 may use counter 340 to determine whether a data transmission was successful or when an acknowledgement regarding a past transmission is expected. For example, in one implementation, node 110 may initialize an entry in frame counter 340 to X upon each transmission. Frame counter 340 may then count from X to zero following a data transmission. Frame counter 340 may also have an "off" state for resetting and re-initializing frame counter 340.

Nodes 110, as discussed above, may create and transmit packets or receive packets from other devices (e.g., user devices) and transmit these packets. In addition, nodes 110 may receive instructions from gateway 120 and transmit packets to gateway 120 based on the instructions. In order to accomplish this, nodes 110 may maintain information on their packet's TAP label and the number of frames since their last transmission via frame counter 340.

The information on a packet's TAP label allows each node 110 to identify when gateway 120 is requesting that a new packet be sent or a previously transmitted packet be re-sent. Information on the number of frames since its last transmission may allow node 110 to determine whether a transmission was successful or whether it can expect to receive an acknowledgement (e.g., information indicating that a collision occurred) regarding that transmission.

Gateway 120, consistent with the invention, may broadcast information to all nodes 110 in network 100. Each node 110 may have access to gateway 120 through a shared uplink channel. Gateway 120, however, can accurately receive/decode packets from only one node 110 at a time. Gateway 120 also controls which packets can be sent/re-sent each frame and relays this information to nodes 110 via, for example, a downlink broadcast.

In order to efficiently schedule channel traffic, gateway 120 may store information regarding each of a number of the collision resolution trees that have been created to resolve collisions involving data packets.

Figure 4:
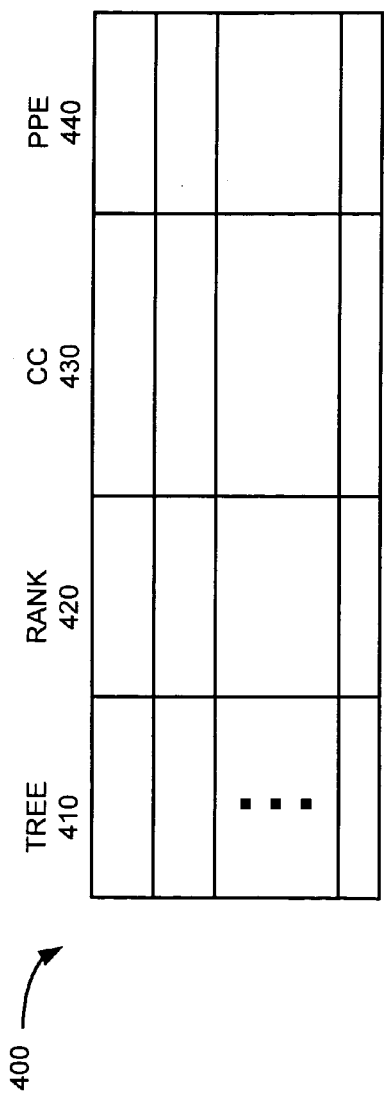
FIG. 4 is a block diagram illustrating exemplary elements implemented in the gateway of FIG. 1.

FIG. 4 is a block diagram of exemplary elements that may be implemented in gateway 120. The elements illustrated in FIG. 4 may be implemented in software, hardware or combinations of hardware/software. Referring to FIG. 4, gateway 120 may include a table 400 that identifies collision resolution information and a table 460 that stores a list of previous TAP requests broadcast to nodes 110. Tables 400 and 460 may be stored, for example, in a memory in gateway 120, such as memory 260 (FIG. 2).

Table 400 may include a tree field 410, a rank field 420, a collision count (CC) field 430 and a possible priority entry (PPE) field 440. Tree field 410 may identify a particular collision resolution tree. In an exemplary embodiment, tree field 410 may store any of X possible labels/identifiers (e.g., A, B, C, etc.). X, as discussed above, may represent the round trip propagation time from gateway 120 to node 110 and back to gateway 120, expressed as an integer number of frames.

Rank field 420 may establish each tree's precedence relative to other trees. In an exemplary embodiment, the range of possible ranks for a tree are 0, 1, 2, etc. Initially, all trees in table 400 have a rank of 0 upon start up of gateway 120 since no collisions have occurred in network 100. However, once gateway 120 and nodes 110 are operating and multiple resolution trees exist, the ranks stored in field 420 are assigned such that the oldest tree has the highest rank.

CC field 430 may store a value representing a number of collisions within a specific tree. In an exemplary embodiment, values in CC field 430 may range from 0, 1, 2, etc. A CC value of 1 may represent a first collision within a tree, a CC value of 2 may represent a second collision with the tree and so on. In an exemplary embodiment, CC field 430 may be initialized to a value of 0 prior to the detection of a collision within a particular tree. PPE field 440 may store a list of possible priority values generated after previous packet collisions. Each of these PPE values is used to request the re-transmission of previously colliding data packets, as described in more detail below.

Table 460 may include a previous frames field 470 and a TAP request field 480. Previous frames field 470 may range from 1 to X, where 1 represents a TAP request transmitted 1 frame earlier and X represents a TAP request transmitted X frames earlier. The corresponding value stored in TAP request field 480 represents the TAP request transmitted during the frame period identified in field 470. In other words, table 460 stores a list of the previous X TAP requests transmitted by gateway 120.

Gateway 120 uses tables 400 and 460 to request data from nodes 110 in an efficient manner. Gateway 120 also interacts with nodes 110 to ensure that packets that resulted in collisions are eventually received successfully at gateway 120. Gateway 120 also accesses information in tables 400 and 460 when assigning TAP labels to previously unsent packets in node 110.

Figure 5:
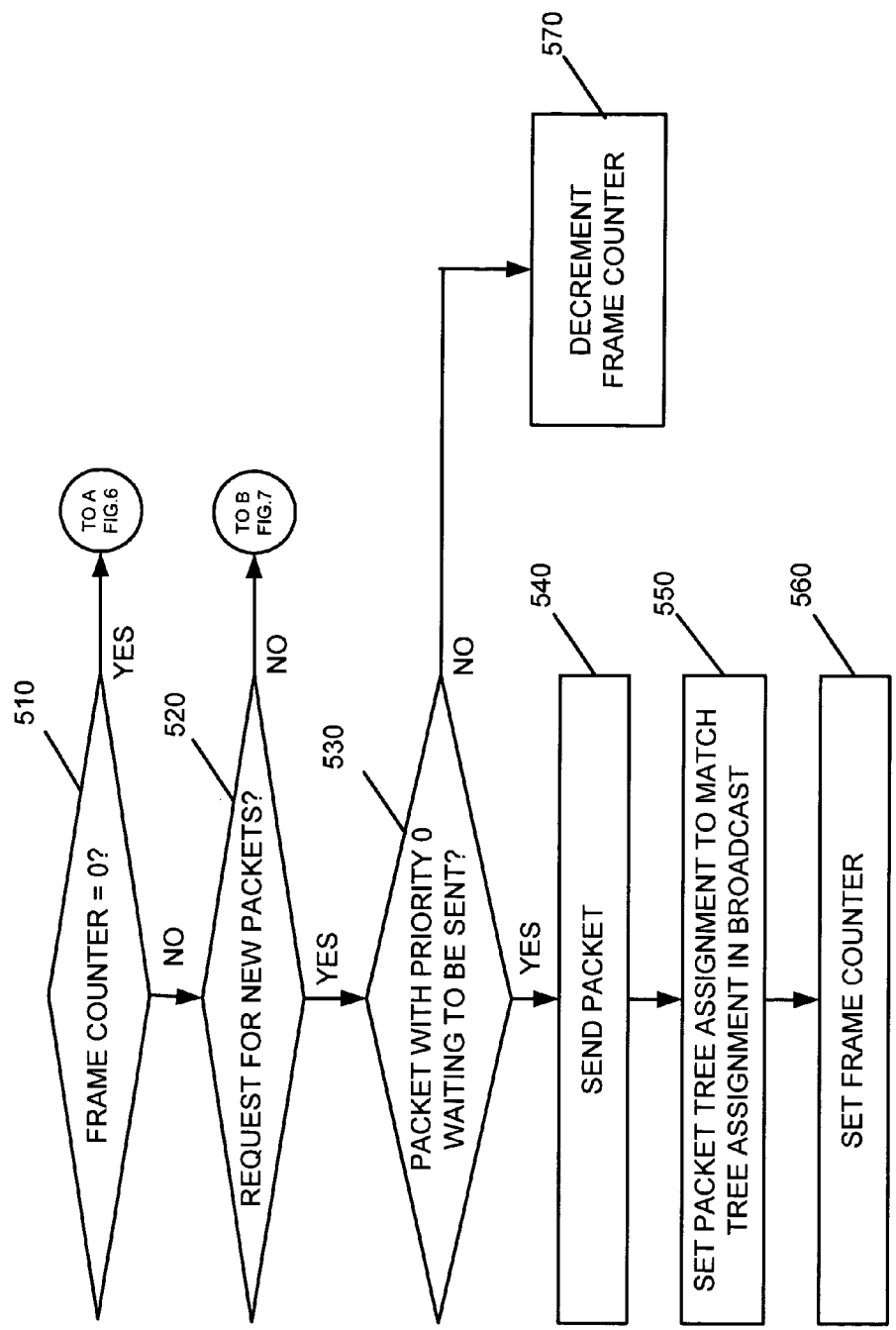
FIGS. 5-7 are flow diagrams illustrating exemplary processing associated with transmitting data packets from the node of FIG. 1 in accordance with an implementation consistent with the invention.
Figure 6:
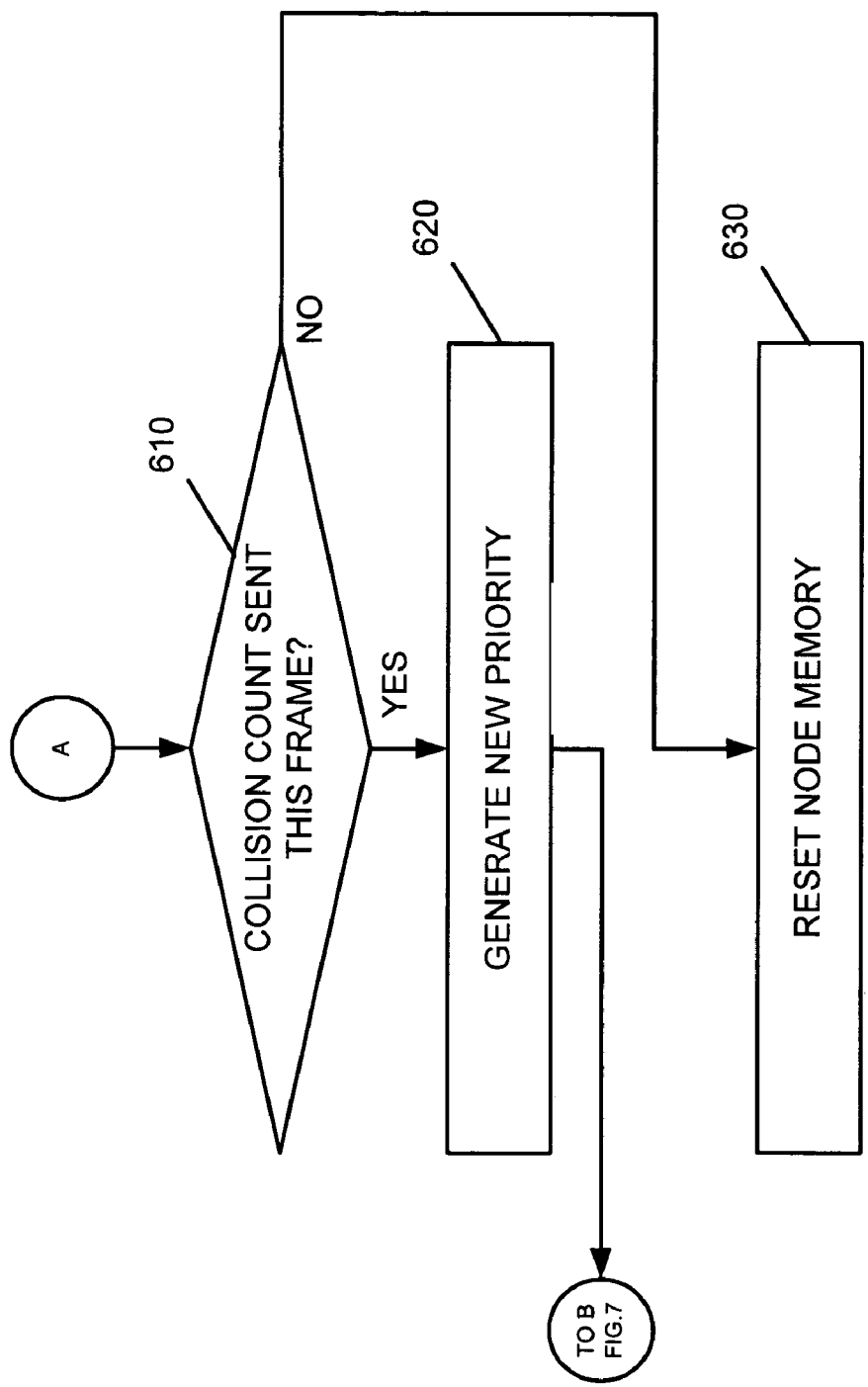
Figure 7:
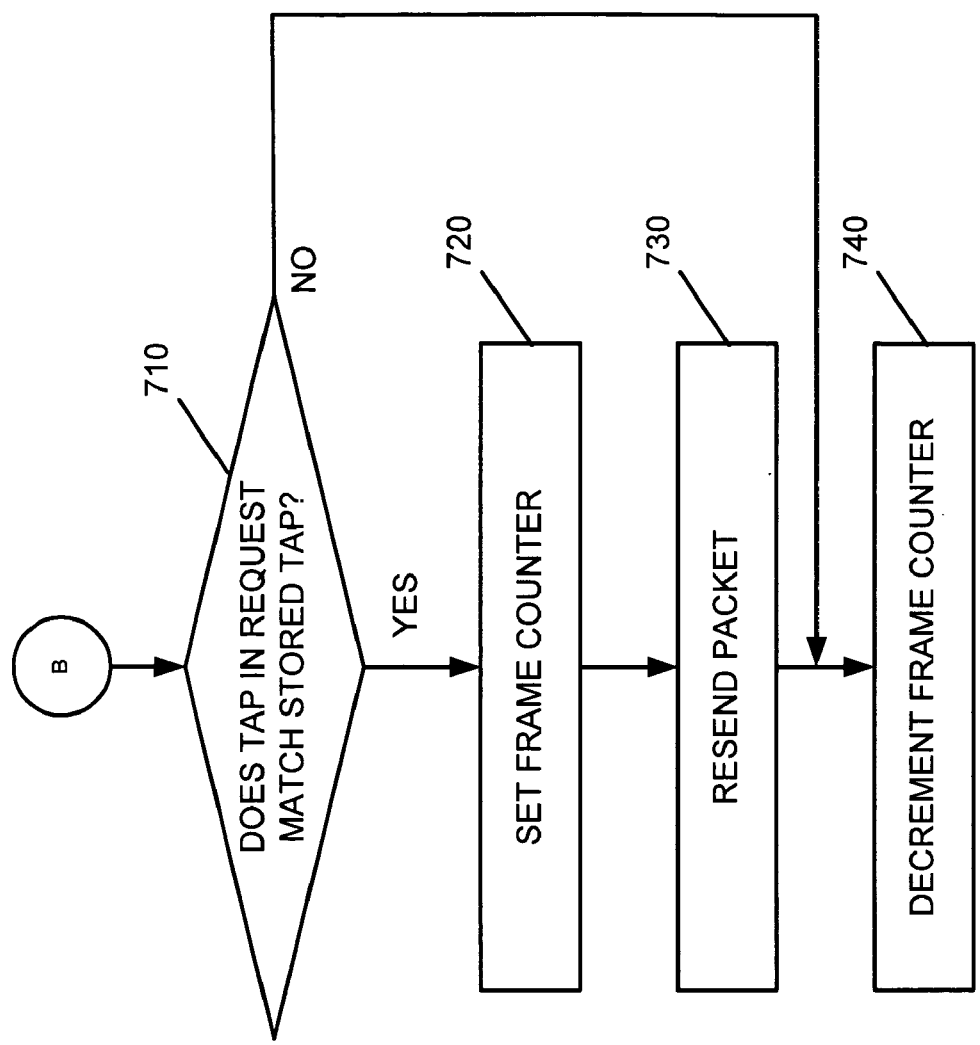

FIGS. 5-7 are flow diagrams illustrating exemplary processing performed by a node 110 during each particular frame. The term "frame" as used herein refers to a duration of time. For simplicity, the discussion below assumes that a single data packet may be transmitted during each frame. It should be understood, however, that in some implementations, the duration of a data packet generated by nodes 110 may be greater (or smaller) than that of a frame.

Processing may begin for each frame with node 110 determining whether a value in frame counter 340 corresponding to a packet in packet field 310 is equal to 0 (act 510). As described previously, when node 110 transmits a data packet, frame counter 340 may set a value corresponding to the transmitted data packet to X. In an exemplary implementation, node 110 may set frame counter 340 to count from X down to 0, where X represents the round trip propagation time expressed as a number of frames for sending a signal from node 110 to gateway 120 and back to node 110. That is, X represents an integer number of frames corresponding to the round trip propagation delay associated with node 110 and gateway 120.

If the value in frame counter 340 is not equal to 0, node 110 may then determine whether a request for new data packets has been received (act 520). For example, in one implementation, gateway 120 may transmit a broadcast message for new data packets with a priority value of 0, indicating that new data is being requested, as opposed to data that has been previously sent and resulted in a collision. In this case, node 110 determines whether a data request message with a priority value of 0 has been received.

Assume that a broadcast message with a priority value of 0 has been received. In this case, node 110 determines whether it has a packet waiting to be sent that has a priority of 0 (act 530). That is node 110 determines whether it has a new data packet to send by checking table 300 and determining whether a packet with a priority value of 0 is stored in priority field 330. If node 110 has a new packet waiting to be sent, node 110 sends the packet during this frame (act 540). Node 110 also updates its TAP tree assignment to match the tree assignment given in the broadcast message (act 550). That is, the broadcast message received by node 110 includes the priority value of 0 and a tree assignment value. The tree assignment value is used by gateway 120 to assign all packets transmitted during this frame to the same collision resolution tree. By matching the tree assignment for the packet that was just transmitted to the tree assignment provided in the broadcast message from gateway 120, gateway 120 may then use this common tree information to resolve collisions, as described in more detail below.

In this example, since the broadcast message at act 520 was a priority 0 message, node 110 sets its priority associated with the data packet that was just transmitted in field 330 to 0.

Node 110 also sets the entry in frame counter 340 corresponding to the transmitted data packet (act 560). As discussed previously, node 110 may set frame counter to X, where X represents an integer number of frames corresponding to the round trip propagation delay. If no packets with priority 0 are waiting to be sent, node 110 decrements the value(s) in frame counter 340 by one (act 570).

Referring back to FIG. 5 at act 510, if the value of frame counter 340 for a particular packet is equal to 0, indicating that the particular packet was sent X frames ago, node 110 determines whether during this frame, node 110 received information indicating that a collision occurred (FIG. 6, act 610). For example, if gateway 120 received information during a particular frame and was unable to correctly decode the data, this indicates that a collision occurred. In an exemplary implementation, gateway 120 may transmit collision count (CC) information when this occurs. The CC, as described in more detail below, is used by gateway 120 as a negative acknowledgment regarding a previous transmission.

If node 110 receives a CC indicating that a collision occurred, node 110 generates a new priority value for the packet involved in the collision (act 620). In an exemplary implementation, node 110 may generate the new priority using the following formula: New priority=CC*2−random [0 or 1]. This formula essentially sets up a binary tree for all colliding packets. In other words, each of the packets involved in the collision will be initially assigned a high priority value or a low priority value.

If no CC was received during this frame, node 110 may reset its memory with respect to the packet transmitted X frame earlier (act 630). That is, node 110 may reset or delete the values in fields 310, 320 and 330 since it has not received a negative acknowledgement (e.g., a CC count) X frames after the packet was sent. This indicates that gateway 120 successfully received the packet and node 110 no longer has to retain bookkeeping information for the packet sent X frames ago.

Referring back to FIG. 5 at act 520, if the broadcast message received from gateway 120 during this frame is not a request for new packets (e.g., a priority 0 request) or new priority information was generated at act 620, node 110 determines whether the TAP label included in the broadcast message from gateway 120 matches a stored TAP label (i.e., the information stored in fields 320 and 330 in table 300) (FIG. 7, act 710).

If the received TAP label matches a TAP label stored in table 300, node 110 may reset the value in frame counter 340 corresponding to the particular TAP label to X (act 720). Node 110 may also re-send the packet stored in field 310 that corresponds to the matched TAP label to gateway 120 (act 730). At the end of the frame (e.g., after re-transmitting the packet), node 110 may also decrement the value(s) in frame counter 340 (act 740). This will enable node 110 to know when to expect a CC or acknowledgment for this re-sent packet.

If the TAP label associated with the broadcast message does not match a stored TAP label, node 110 may decrement the value(s) in frame counter 340 (act 740) and wait for the next frame.

Figure 8:
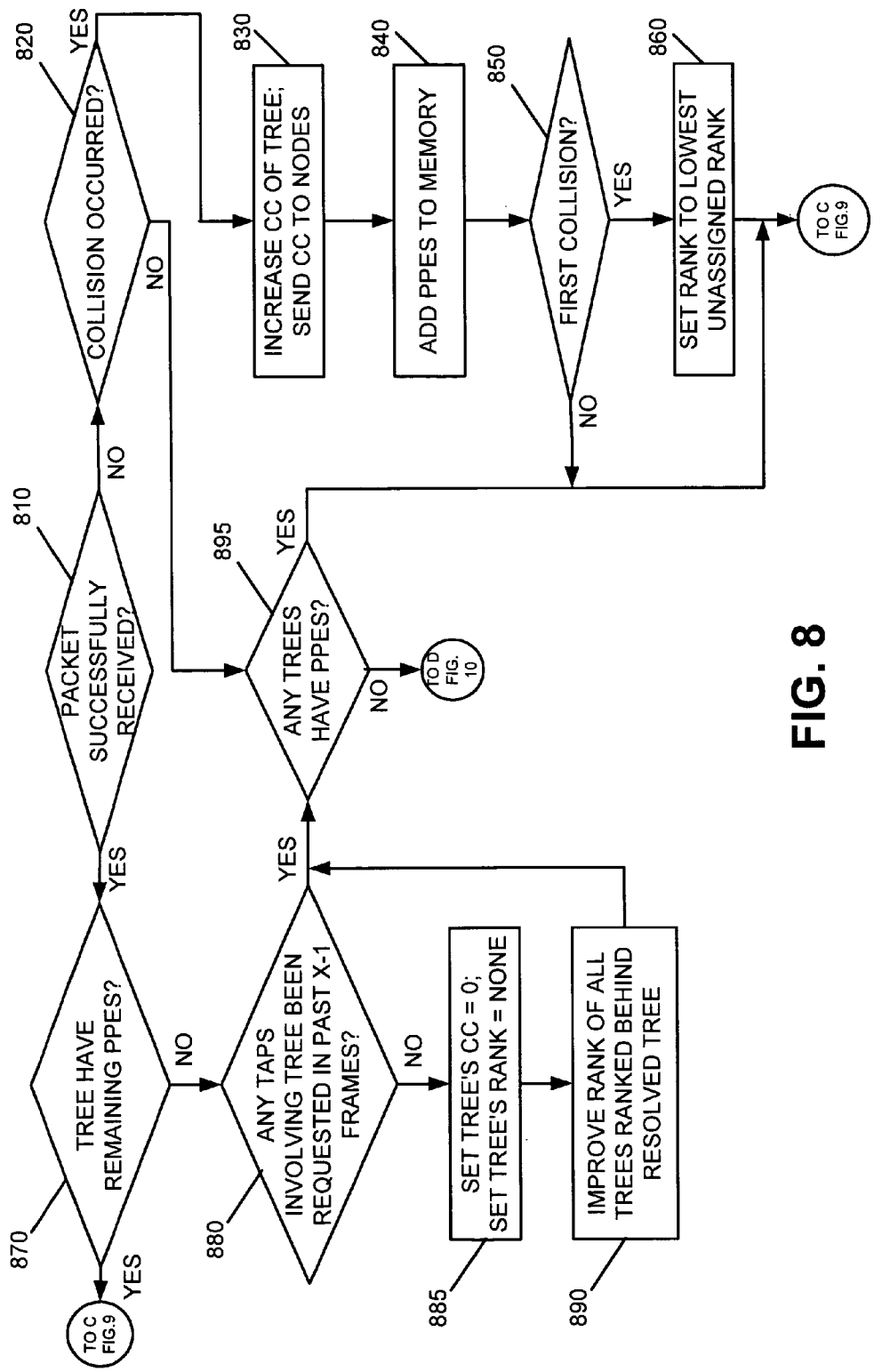
FIGS. 8-10 are flow diagrams illustrating exemplary processing performed by the gateway of FIG. 1 in accordance with an implementation consistent with the invention.

Node 110 performs the processing illustrated in FIGS. 6-8 during each frame. As discussed above with respect to FIGS. 6-8, node 110 performs this processing in response to information received from gateway 120.

Gateway 120, as discussed in more detail below, performs actions in response to its memory content and the traffic it receives. For example, the traffic from nodes 110 can result in a collision or a successful packet reception. In addition, during any particular frame, no traffic may exist in network 100. Using the traffic status as an input, gateway 120 may perform processing to efficiently enable the transmission/re-transmission of data over the shared channel. During each frame, gateway 120 may perform a number of processes. For example, a first process may involve gateway 120 updating its memory based on the current frame's channel status. Another process may involve determining which TAP label to request based on the updated memory state of gateway 120.

Figure 9:
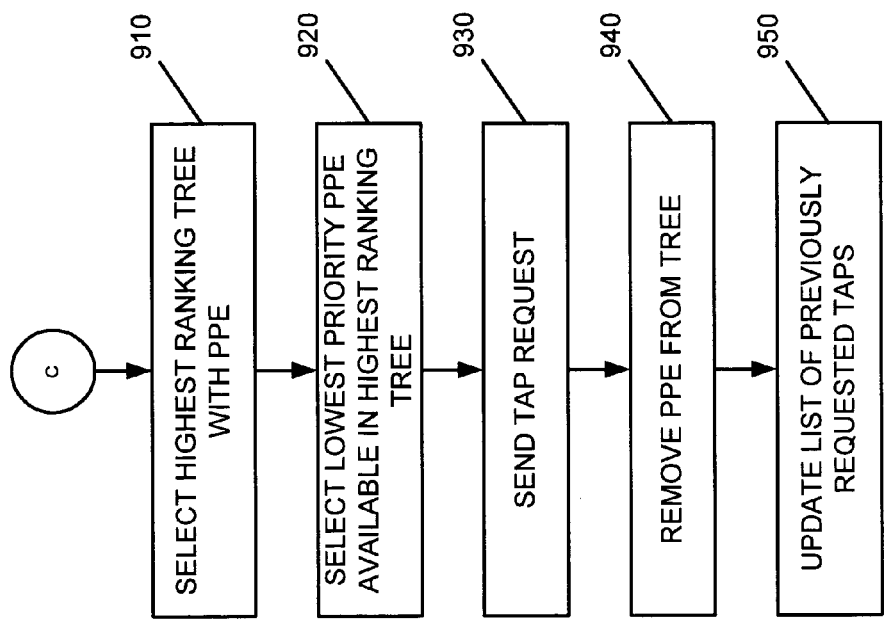
Figure 10:
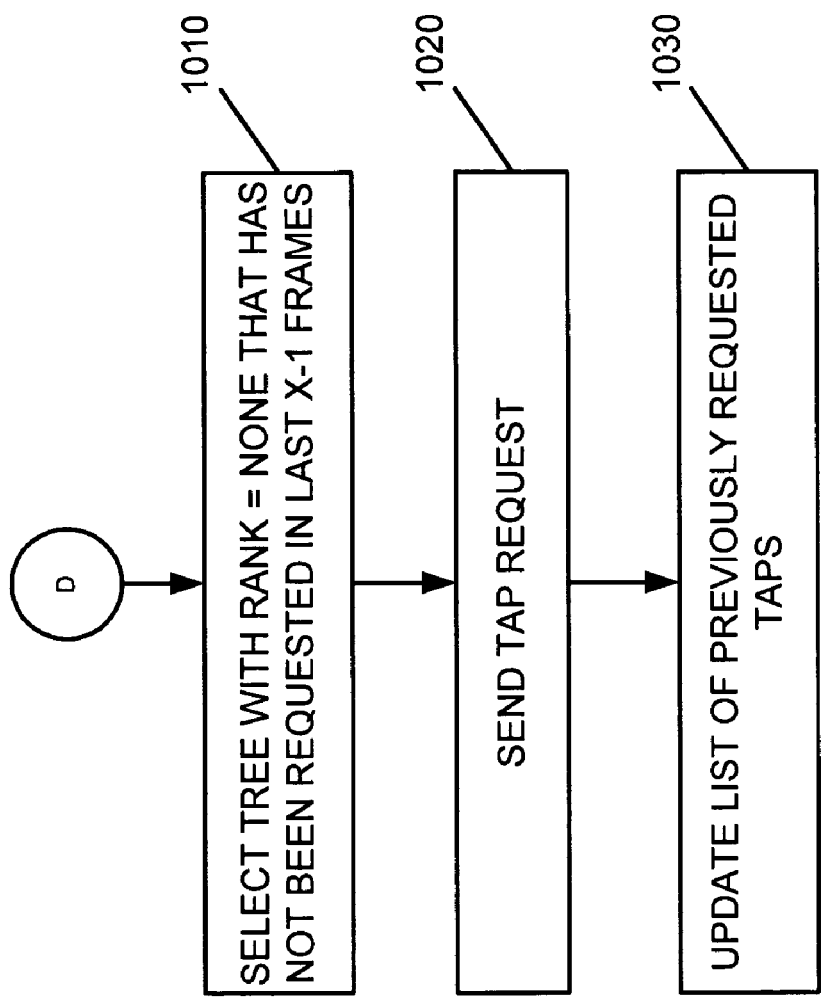

FIGS. 8-10 are flow diagrams illustrating exemplary processing performed by gateway 120 during each particular frame. Processing may begin each frame with gateway 120 determining whether a packet has been successfully received (act 810). This determination may include receiving and successfully decoding a received data packet. The decoding may include using, for example, error detection/correction codes and/or other techniques to determine whether the packet was successfully received. Such codes and techniques associated with determining whether a packet is successfully received are well known and are not described further herein in order to not obscure the thrust of the invention.

If a packet has not been successfully received, gateway 120 may determine whether a collision occurred (act 820). A collision may be detected by gateway 120 if data is received during a frame, but gateway 120 is unable to successfully decode the received data. If no collision has been detected, this means that a null frame has occurred (i.e., there is simply no traffic during this frame). In the case of a null frame, gateway 120 makes no memory updates.

If, however, a collision has occurred, gateway 120 increases the appropriate tree's CC value by one and broadcasts the CC information to nodes 110 (act 830). In an exemplary implementation, gateway 120 may determine to which tree the colliding packets have been assigned by checking table 460. For example, since the propagation delay time is known to be X, the tree assignments of the currently colliding packets are the result of a TAP request transmitted by gateway 120 to nodes 110 X frames earlier. In this manner, gateway 120 may identify the appropriate tree by reading the TAP request information stored in field 480 of table 460 corresponding to the entry X in field 470.

For ease of discussion below, assume that the tree corresponding to the tree assignment of packets received in the current frame is tree H. In this case, gateway 120 increases the CC value in field 430 of tree H by one. Gateway 120 may also add two new PPEs to its memory (e.g., field 440 corresponding to tree H) (act 840). For example, to facilitate the future retransmission of all packets involved in the collision, gateway 120 may add PPEs corresponding to both $CC*2-1$ and $CC*2$ to entry 440 in table 400 corresponding to tree H. Therefore, if the collision is a first collision and CC is equal to one, gateway 120 generates PPEs of 1 (i.e., $CC*2-1$) and 2 (i.e., $CC*2$) and adds the values 1 and 2 to PPE field 440. Both of these PPEs are added to table 400 since they both constitute possible reprioritization values which nodes 110 may generate when they independently reprioritize their packets. That is, referring back to the discussion above with respect to act 620 in FIG. 6, nodes 110 generate new priority values using the formula $CC*2$ minus a random value of 0 or 1. Therefore, gateway 120 adds two PPE values to cover both possibilities.

In addition, whenever a collision occurs, gateway 120 determines if this is the first collision for a particular tree (act 850). For example, a rank of 0 may indicate a particular tree that has not been involved in a collision. If the collision is a first collision, tree H is assigned the lowest unassigned rank (act 860). For example, if tree A in table 400 is assigned a rank of 1 and tree B is assigned a rank of 2 and the other trees have no rank at this time (e.g., rank of none), tree H may be assigned a rank of 3. In an exemplary implementation, lower numerical rank values represent trees having higher priorities. That is, a rank of 1 may represent the highest ranking tree.

In the event that a packet was successfully received at act 810, gateway 120 may determine if the successful reception of the packet constitutes a complete resolution of a collision tree. For example, gateway 120 may determine if tree H has any PPEs remaining (act 870). It should be noted that after gateway 120 sends a request message with a priority value corresponding to one of the PPEs in field 440, that PPE may be deleted from field 440. If no PPEs remain, gateway 120 may determine whether any TAP label associated with the tree have been requested in the past X−1 frames (act 880). If the determination for each of acts 870 and 880 is no, tree H may be considered to be resolved. In this case, gateway 120 may reset the entries corresponding to tree H in table 400. That is, gateway 120 may reset the CC of tree H to 0 and set H's rank to "none" (act 885). This allows entries in table 400 of gateway 120 to be reused for subsequent collision trees.

Gateway 120 may also modify the rank of all trees that previously had assigned ranks that were greater in numerical value (indicating a lower priority) than the reset tree (i.e., tree H) (act 890). For example, if the resolved tree H has a rank of 3 and a tree K has a rank of 4, tree K will be promoted to a rank of 3. Other trees having higher numerical values stored in rank field 420 than the resolved tree may be similarly promoted. This allows the numerical ranking system to maintain the range of 1 to X.

As described above, during each frame, gateway 120 also determines what information should be broadcast to nodes 110. In an exemplary implementation, if gateway 120 determines that no collisions occurred during the current frame (act 820), that TAP labels associated with tree H have been requested in the past X−1 frames (act 880) or a collision tree has been resolved (acts 885, 890), gateway 120 determines whether any trees have PPEs (act 895). That is, gateway 120 examines table 400 and determines whether any PPEs exist in field 440. The presence of PPEs in table 400 indicates that there are still unresolved collisions. This means that nodes 110 are waiting to re-transmit their packets. Once these PPE entries in table 440 are attended to, gateway 120 may transmit a signal requesting that nodes 110 send previously unsent packets.

Suppose that there are trees with PPE entries in field 440 (act 895), that tree H (as determined at act 870) has remaining PPEs or that gateway 120 determines that the collision is not the first collision (at act 850). In this case, gateway 120 selects from those trees with PPEs, the tree with the highest rank (FIG. 9, act 910). For ease of discussion, assume that the selected tree is tree K. Gateway 120 may then select the lowest priority PPE from tree K (act 920). For ease of discussion, assume that the lowest priority PPE has a value of 4. Gateway 120 may then transmit a TAP request with a packet label of K4 (act 930). Gateway 120 may also remove this PPE (i.e., PPE having a value of 4) from the list of PPEs (act 940). Gateway 120 may also update its lists of previously transmitted TAP requests to include the new TAP request (act 950). That is, gateway 120 may update table 460 to indicate that TAP request K4 was transmitted one frame earlier.

Alternatively, if gateway 120 determines that there are no trees with PPE entries at act 895, gateway 120 may transmit a message that indicates to nodes 110 that they should send any previously unsent packets they have (i.e., a priority 0 request). That is, instead of a re-transmission, all previously unsent packets may be requested. This may be achieved by transmitting a TAP request for a packet with a priority equal to 0.

Tree assignments sent with a TAP request containing a priority of zero may have a special function. For example, such TAP requests assign all packets sent during that frame to a specific tree (i.e., the tree identified in the TAP request). To ensure proper ordering of separate trees, only those trees that are assured of having no outstanding packets requests may be selected for a transmission in which previously unsent packets are requested.

For example, to find a tree that adheres to the precedent above, gateway 120 evaluates the ranks of the trees in table 400. Of the trees that have a rank of none, gateway 120 selects a tree that has not been involved in TAP requests during the past X−1 frames (FIG. 10, act 1010). Assume for discussion purposes, that the selected tree is tree R. Once tree R has been selected, gateway 120 broadcasts a TAP request including TAP label R0 (act 1020). At the end of each frame, gateway 120 may then update its list of previously requested TAPs in table 460 to reflect the actions during this frame (act 1030).

Figure 11:
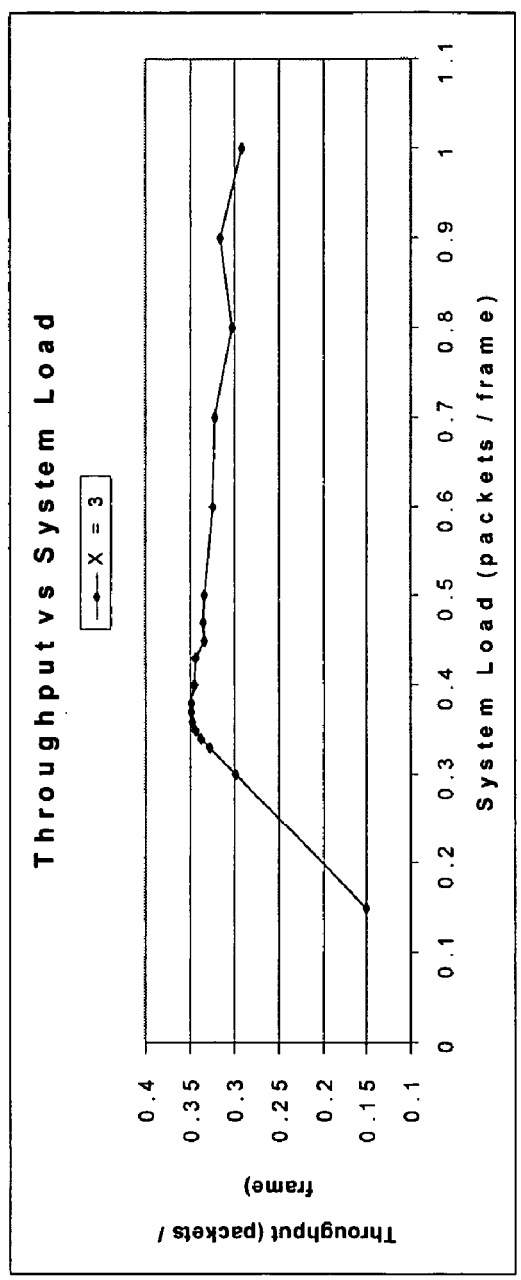
FIGS. 11 and 12 are exemplary diagrams illustrating data throughput versus system load achieved using techniques consistent with the invention.
Figure 12:
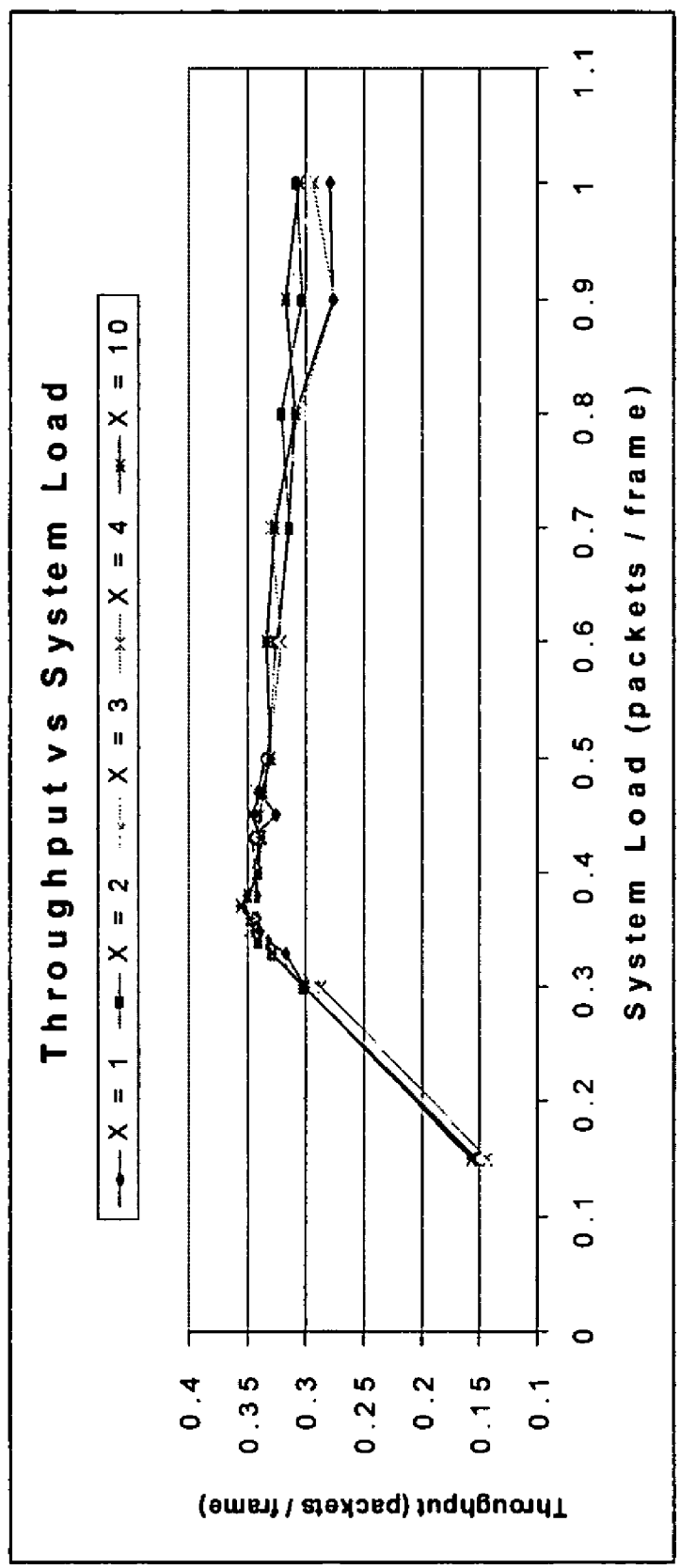

As described above, gateway 120 and nodes 110 interact to transmit data over a shared medium in an efficient manner, while taking into consideration propagation delay that is inherent in network 100 by selectively requesting packets which belong to one of possibly many resolution trees. FIGS. 11 and 12 are diagrams illustrating exemplary data throughput versus system load obtained for a network (e.g., network 100) that implements the collision resolution techniques described above. FIG. 11 illustrates a network with a propagation delay (i.e., X) equal to three frames. FIG. 12 illustrates a network with propagation delays of 1, 2, 3, 4 and 10 frames. The information in FIGS. 11 and 12 was obtained using a computer simulation. As illustrated in FIGS. 11 and 12, computer modeling of the protocols discussed above shows that the implementations consistent with the invention may provide an average throughput of approximately 0.35 packets per frame in lightly loaded scenarios, regardless of the propagation delay in the system.

This result advantageously illustrates that the scheduling scheme described above can achieve approximately the same throughput as that for a system using a conventional tree protocol collision resolution system in which no propagation delay is taken into consideration. That is, despite propagation delay, systems and methods consistent with the invention are able to achieve approximately the same throughput as that which could be achieved using conventional approaches that do not factor in real world propagation delay involved in transmitting data.

The diagrams illustrated in FIGS. 11 and 12 were generated using a network (e.g., network 100) loaded by instructing nodes (e.g., nodes 110) to generate packets according to a constant Poisson load parameter. As can be seen in FIGS. 11 and 12, when the rate of traffic loading was less than 0.35 new packets per frame, the system was able to match the throughput to this load. However, once new traffic was introduced at an average rate exceeding 0.35 packets per frame, the network became saturated. In this case, the additional packets (i.e., packets greater than 0.35 packets/frame) acted to increase channel backlog due to collisions. As a result, average loads higher than 0.35 packets per frame resulted in a slight decrease in throughput, as illustrated in FIGS. 11 and 12.

It can be readily observed in FIGS. 11 and 12, however, that the performance of the protocol is independent of the propagation delay of the system in which it is implemented for loads less than about 0.35 packets per frame. A guaranteed quality of service (QOS) may therefore be obtained for such lightly loaded systems, regardless of their inherent propagation delay.

CONCLUSION

Systems and methods consistent with the invention execute a collision resolution protocol that is able to achieve high data throughput despite propagation delays that may exist. This provides an efficient system for transmitting data over a shared channel.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, implementations described above refer to creating re-prioritization information that define two possible values or branches of a collision resolution tree. In other implementations, re-prioritization may include generating three or more possible reprioritization values (e.g., branches), after a collision is detected. In addition, in alternative implementations, collision count information may be stored at each node, as opposed to at the gateway.

Further, in the exemplary description above, a timer/counter was used to determine when an acknowledgement (e.g., a negative acknowledgement) is expected. In alternative implementations, a tag or identifier can be transmitted with the data packets transmitted to the gateway. In this case, the gateway may transmit a positive acknowledgement with the tag/identifier of the packet when the packet is successfully received. This may eliminate the need for timers/counters at the nodes.

In addition, in the exemplary description above, the gateway was described as transmitting messages to a number of nodes over a single broadcast channel. In some implementations, the gateway may broadcast messages to a number of groups of nodes over a channel dedicated to each particular group of nodes. That is, multiple broadcast channels may be utilized for transmitting data from the gateway to various groups of nodes and vice versa.

Further, the exemplary description above refers to "packets" being transmitted by the nodes to the gateway. The term "packet" as used herein may refer to a discrete-time, digital information structure. It should also be understood that implementations consistent with the invention may also be used in analog or continuous wave transmission systems. In such implementations, the nodes would utilize a frame structure for the analog transmissions that are of a set duration.

Lastly, while series of acts have been described with respect to FIGS. 5-10, the order of the acts may be modified in other implementations consistent with the present invention. Moreover, non-dependent acts may be performed in parallel. In addition, the invention has been described mainly with respect to transmitting data over a wireless/free space interface to, for example, a satellite. It should be understood that techniques consistent with the principles of the invention may be used when transmitting data over any shared medium, including wired or optical mediums.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed is:

1. A network device for controlling transmission of data from a plurality of nodes sharing a channel, comprising:
a receiver configured to receive transmissions sent by the plurality of nodes;
control logic configured to generate a first message requesting transmission of data from the plurality of nodes, the first message including an identification label;
a memory configured to store:
a first plurality of identification labels associated with a plurality of messages transmitted by the network device, and a second plurality of identification labels associated with messages to be transmitted by the network device; and a transmitter configured to broadcast the first message to the plurality of nodes.

2. The network device of claim 1, wherein the memory is further configured to store:

ranking information associated with the second plurality of identification labels.

3. The network device of claim 1, wherein the control logic is further configured to:

detect whether a collision has occurred, and generate a second message comprising a collision value associated with a detected collision, and wherein the transmitter is further configured to:

transmit the second message identifying the collision value to the plurality of nodes.

4. The network device of claim 1, wherein the control logic is further configured to:

generate at least a first value and a second value when a collision is detected, and store the first and second values in the memory.

5. The network device of claim 4, wherein the control logic is further configured to:

transmit a second message to the plurality of nodes, the second message including one of the second plurality of identification labels and the first value.

6. The network device of claim 5, wherein the control logic is further configured to:

transmit a third message to the plurality of nodes, the third message including one of the second plurality of identification labels and the second value.

7. The network device of claim 1, wherein the control logic is configured to generate information representing candidates for future requests when a response to the first message resulted in a collision.

8. The network device of claim 1, wherein each of the first plurality of identification labels comprises tree assignment information and ranking information, and wherein the control logic is further configured to:

generate message requests to resolve collisions associated with data packets that share a common tree assignment in an order based on the ranking information.

9. The network device of claim 8, wherein when resolving collisions, the control logic is configured to:

identify a highest ranking tree, and generate a second message comprising an identification label that matches the highest ranking tree, and wherein the transmitter is further configured to:

transmit the second message to the plurality of nodes.

10. The network device of claim 1, wherein the control logic is further configured to:

resolve collisions involving a first tree structure, and modify a rank of a plurality of other tree structures after collisions involving the first tree structure have been resolved.

11. The network device of claim 1, wherein the control logic is further configured to:

recognize when no candidates for future request messages are stored in the memory, and request transmission of data packets that have not been previously transmitted to the network device.

12. The network device of claim 1, wherein the memory is further configured to:

store the first plurality of identification labels for a predetermined period of time.

13. The network device of claim 1, wherein the control logic is further configured to generate a negative acknowledgement message when a collision involving data packets transmitted in response to the first message is detected.

14. The network device of claim 1, wherein each data packet transmitted in response to the first message is assigned to a first tree structure.

15. The network device of claim 1, wherein the control logic is further configured to:

forward data received from the plurality of nodes to a destination device.

16. The network device of claim 1, wherein the control logic is further configured to:

determine an approximate propagation time associated with transmitting data to at least one of the plurality of nodes and receiving a response from the at least one node, and forwarding the propagation time to the plurality of nodes.

17. The network device of claim 1, wherein the memory is configured to store a propagation time representing an approximate amount of time associated with transmitting data to at least one of the plurality of nodes and receiving a response from the at least one node.

18. The network device of claim 1, wherein the network device is located on a satellite and the transmitter is configured to transmit messages over a wireless channel.

19. In a network device configured to control communication of data transmitted from a plurality of nodes over a shared communication medium, a method comprising:

generating a first request for data from the plurality of nodes, the first request including a first identifier;

transmitting the first request to the plurality of nodes;

detecting a collision involving data transmitted in response to the first request;

generating at least first and second values in response to detecting the collision, the generated values being associated with the first identifier;

transmitting a collision message to the plurality of nodes; and transmitting a first request for re-transmission to the plurality of nodes, the first request for re-transmission including the first identifier and the first value.

20. The method of claim 19, further comprising:

transmitting subsequent requests for re-transmission, the subsequent requests for re-transmission including the first identifier and a generated value.

21. The method of claim 19, wherein the first identifier represents a tree structure and the first and second values represent priority values within the tree structure.

22. The method of claim 19, further comprising:

generating a plurality of requests for data from the plurality of nodes, each of the plurality of requests being associated with one of a plurality of tree structures.

23. The method of claim 22, further comprising:

resolving collisions resulting from the plurality of requests in an order corresponding to rankings associated with the plurality of tree structures.

24. A system for controlling communications in a network that includes a plurality of nodes transmitting data over a shared communication medium, comprising:

means for generating a request message, the request message being associated with a request for new data and including a tree identifier;

means for transmitting the request message to the plurality of nodes;

means for detecting collisions involving data packets transmitted by the plurality of nodes in response to the request message;

means for generating priority information based on the collisions; and means for transmitting a re-transmission request message, the re-transmission request message including the priority information and the tree identifier.

25. A network device configured to control communications from a plurality of network nodes configured to transmit data to the network device over a shared communication medium, comprising:

logic configured to:
- generate a label identifying a data request transmitted from the network device,
- transmit the label with the data request, the label being used by the plurality of network nodes to determine whether to send data to the network device,
- detect a collision involving data transmissions involving the plurality of network nodes,
- generate at least two priority values when the collision is detected,
- transmit a first one of the at least two priority values and the label to the plurality of network nodes, and
- transmit a second one of the at least two priority values and the label to the plurality of network nodes.

26. The network device of claim 25, wherein the at least two priority values comprise at least a third priority value and the logic is further configured to:

transmit the third priority value and the label to the plurality of network nodes.

27. A system, comprising:

a network device for controlling transmission of data from a plurality of nodes sharing a channel, the network device being configured to:
- generate a first request for data from the plurality of nodes, the first request including tree information and a priority value,
- transmit the first request,
- detect a collision involving data transmitted in response to the first request,
- generate first and second values in response to detecting the collision, the first and second values representing new priority values associated with the tree information,
- transmit a collision message, and
- transmit a request for re-transmission, the request for re-transmission including the tree information and the first value; and a plurality of nodes, each of the nodes being configured to:
- receive the first request,
- determine whether information corresponding to the priority value is stored in the node,
- transmit a data packet when the determining determines that information corresponding to the priority value is stored in the node,
- receive the request for re-transmission,
- determining whether information matching the tree information and the first value is stored in the node, and
- re-transmit the data packet when the determining determines that information matching the tree information and the first value is stored in the node.

* * * * *